United States Patent [19]

Stancati et al.

[11] 4,378,145

[45] Mar. 29, 1983

[54] METHOD AND APPARATUS FOR JOINING OPTICAL ELEMENTS

[75] Inventors: Nicholas T. Stancati, Mountainside; Peter Garner, Flemington; Kevin S. Gordon, Sergeantsville, all of N.J.

[73] Assignee: Thomas & Betts Corporation, Raritan, N.J.

[21] Appl. No.: 126,887

[22] Filed: Mar. 3, 1980

[51] Int. Cl.³ .............................................. G02B 7/26
[52] U.S. Cl. ................... 350/96.21; 350/96.20
[58] Field of Search ............. 350/96.18, 96.20, 96.21, 350/96.22

[56] References Cited

U.S. PATENT DOCUMENTS

| | | | |
|---|---|---|---|
| 4,033,669 | 7/1977 | Hanson | 350/96.20 |
| 4,050,781 | 9/1977 | Beauhaire | 350/96.21 |
| 4,087,155 | 5/1978 | Deacon | 350/96.21 |
| 4,109,994 | 8/1978 | Chown | 350/96.18 |
| 4,119,362 | 10/1978 | Holzman | 350/96.18 |
| 4,153,331 | 5/1979 | Cross | 350/96.20 |
| 4,158,476 | 6/1979 | McCartney | 350/96.21 |
| 4,181,402 | 1/1980 | Borsuk et al. | 350/96.21 |
| 4,186,998 | 2/1980 | Holzman | 350/96.21 |
| 4,190,316 | 2/1980 | Malsky et al. | 350/96.18 |
| 4,208,093 | 6/1980 | Borsuk | 350/96.20 |
| 4,217,029 | 8/1980 | Kao | 350/96.21 |

FOREIGN PATENT DOCUMENTS 5572573  11/1974  Australia ................... 350/96.15

OTHER PUBLICATIONS

Tsuchiya et al., "Double Eccentric Connectors For Optical Fibers," *Applied Optics*, vol. 16, No. 5, May 1977, pp. 1323–1331.

*Primary Examiner*—John D. Lee
*Attorney, Agent, or Firm*—Robert M. Rodrick; Salvatore J. Abbruzzese; Jesse Woldman

[57] ABSTRACT

In terminating an optical element, such as an optical fiber, a housing includes an entry aperture for the fiber and terminating apparatus defining mutually discontinuous surfaces in abutting relation to the fiber end face, the surfaces being spaced from one another in a circular locus having a diameter not greater than the diameter of the fiber.

26 Claims, 9 Drawing Figures

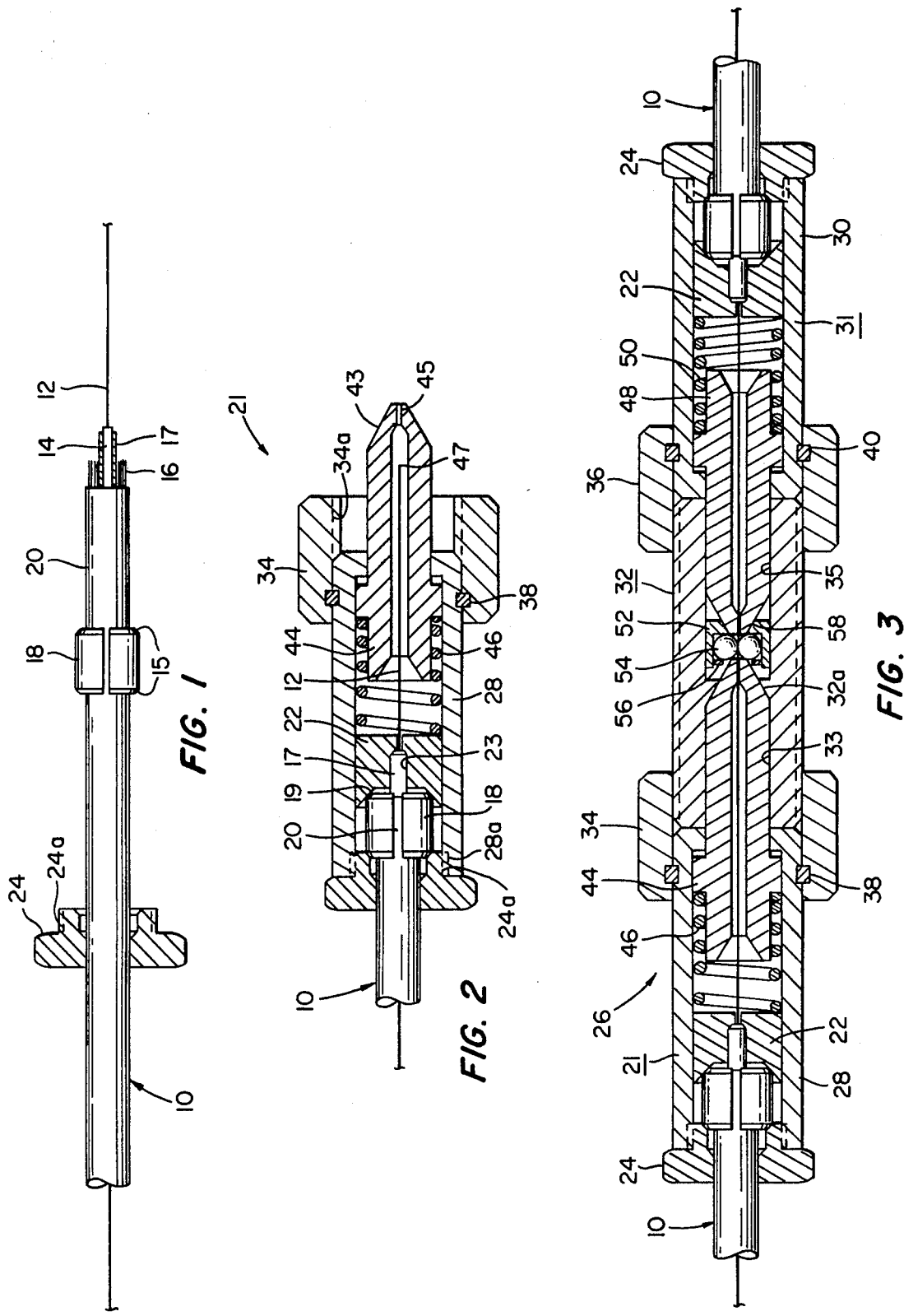

METHOD AND APPARATUS FOR JOINING OPTICAL ELEMENTS

FIELD OF THE INVENTION

This invention relates to method and apparatus for terminating optical elements, and pertains more particularly to the termination or joinder of optical fibers.

BACKGROUND OF THE INVENTION

In coupling separate optical fibers in an optical fiber cable for light transmission, coupling efficiency is achieved in measure corresponding to the level of three-dimensional alignment of the fibers. The fibers are elongate, comprising light-transmitting cores and a cladding having an index of refraction less than that of the core. The fiber in the cable is surrounded by a plastic buffer material and an outer plastic jacket. In typical preparation for connection, the jacket and buffer are stripped from each fiber to expose selected fiber lengths. The fibers are then disposed in fixed position in individual connector parts to be joined in such three-dimensional registry as to impart desired alignment to the fibers.

Misregistration can occur in any one of the three axes of alignment, based on tolerances applicable to each of the matable connector parts. Any of X or Y-axis misalignments will give rise to substantially lesser coupling efficiency than will a further coupling loss geometric parameter, namely, endwise spacing along the Z-axis between aligned fibers. Various such connectors employing matable parts holding fibers in alignment are set forth in the statement filed herein pursuant to 37 CFR 1.97 and 1.98.

Beyond the above described efforts, the optical element coupling art has seen alternative structure, wherein coupling is achieved, by fiber-to-fiber-interface through a common unitary body, i.e., as is set forth in U.S. Pat. No. 4,119,362, entitled "Optical Fiber Connector Using Opposed Lenses". In the referenced patent, a transparent coupler block is secured within a connector and defines, at opposed sides thereof, cavities having surfaces of revolution which are semispherical at the cavity interior. Tangential to the semispherical surfaces are frustro-conical surfaces which extend to the open ends of the cavities. Full line contact with the fiber end face is provided by either abutment of the fiber with the semispherical surface or with the frustro-conical surface. A self-centering effect is said to be achieved.

In applicants' view, optical element termination in either of the foregoing two described approaches can provide alignment and coupling results and efficiencies in lesser level than that presently desired by the art. Thus, misalignments in the first-described connecting approach are noted to be common without precise machining and control of parts and tolerances. The second approach is considered to give rise to misalignment where the entirety of the fiber end face does not define an end surface having a perfectly round periphery or circumference.

SUMMARY OF THE INVENTION

It is an object of the present invention to provide improved optical element coupling and terminating methods and apparatus.

It is a more particular object of the invention to provide for improved method and apparatus for coupling optical fibers to one another.

In the efficient attainment of the foregoing and other objects, the invention looks toward the provision of an abutting surface relationship with an optical fiber at surface areas spaced mutually about the fiber longitudinal axis and wherein such discontinuous surfaces are spaced in a circular locus having a diameter not greater than the diameter of the fiber being terminated. As against the first-mentioned prior art apparatus, the invention looks to a unitary structure for the mating of such as plural optical fibers to be joined, whereby the precise registration of matable supports for the fibers is not required. As against the latter-described variety of prior art apparatus, the invention contemplates spaced circumferential abutting contact with a fiber whereby the fiber end face irregularity from pure roundness has less probable effect in providing for misalignment of fibers to be joined.

In a particularly employed embodiment, the invention provides optical fiber terminating apparatus wherein first and second sets of surfaces discontinuous about a common axis are disposed in a circular locus in facing relation to opposed entry apertures of a housing, at least one unitary body defining a surface in each of such surface sets. Preferably, plural bodies, for example, three spheres are arranged with their centers in a common plane transverse to the longitudinal axis intended to be common to the axes of a pair of fibers. Each such sphere defines one surface in each of the two sets of discontinuous surfaces intended for abutment with the fibers to be joined. Self-centering is achieved between the two fibers being joined on entry thereof into the housing and into abutment with the sets of surfaces.

In an aspect of the invention, wherein an assembly including terminated fiber optic elements is involved, the diameter of the circular locus containing each surface in abutting relation to the fibers is so selected as to be less than the optical fiber diameters, whereby the fibers are not permitted to pass beyond respective planes of abutment with the terminating unit within the housing. There results an alignment which is in registration in the three axes of concern, the spacing between the fibers along the alignment axis being the only coupling loss parameter. As above noted, this parameter is of least concern to the art in fiber optic coupling.

Other objects and features of the invention will be evident from the following detailed description of preferred embodiments and practices involved in the invention and from the drawings wherein like reference numerals identify like parts throughout.

BRIEF DESCRIPTION OF THE DRAWING

FIG. 1 is a partially sectioned side view of an optical fiber cable showing an exposed optical fiber and parts employed in preparing the fiber for termination.

FIG. 2 is a partially sectioned side view of the parts of FIG. 1 assembled with other parts in a sub-assembly for use in a preferred embodiment for coupling optical fibers.

FIG. 3 is a sectional view of parts of a fiber coupling apparatus constructed in accordance with a preferred embodiment of the invention using a pair of cable sub-assemblies as shown in FIG. 2.

DETAILED DESCRIPTION OF THE PREFERRED EMBODIMENTS

Figure 4:
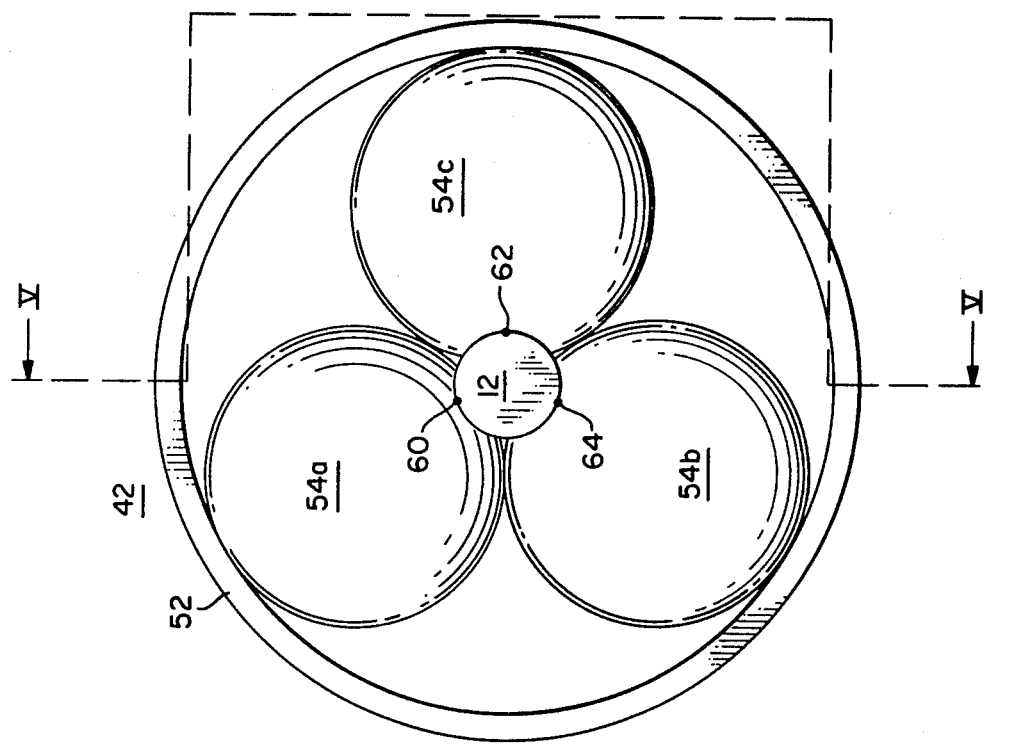
FIG. 4 is a schematic end elevation view of an optical fiber in abutting relation with fiber terminating apparatus in accordance with the invention.

Referring to the drawing, there is shown in FIG. 1 an optical fiber cable 10 of conventional construction, having a fiber 12 comprising a standard optical core and cladding (not shown) for the transmission of light. The cable 10 includes a buffer material 14, typically made of plastic, a plurality of strengthening members 16, such as strands of glass or plastic extending lengthwise along cable 10 and an outer jacket 20 made of plastic, such as, for example, polypropylene. In preassembling the cable 10 for termination of the fiber 12 in a circuit component or for joining to another similarly prepared fiber, the cable jacket 20 is stripped to expose the members 16, a crimpable sleeve 17 is placed over the buffer material 14 and fixedly crimped thereon, and then the exposed portions of the members 16 are removed. A split jacket ferrule 18 preferably having chamfered edges 15 and a compression nut 24 having exterior threads 24a are slid onto the cable jacket 20 for assembling the cable 10 to the stage shown in FIG. 2.

In FIG. 2, there is shown a cable subassembly 21 preferably utilized in the termination and connection apparatus of the present invention. The crimped buffer material 14 and fiber 12 are inserted into an entry aperture of an elongate housing 28 and into a retainer ring 22 fixedly secured axially within the housing, as by, for example, press fitting. The retainer ring 22 has a centrally formed opening therethrough through which the fiber 12 passes and an aperture 23 formed substantially concentrically with the opening for receiving the crimped sleeve 17. A tapered surface 19 facing the ferrule 18 is preferably formed in the retainer ring 22. The housing 28 is threaded interiorly at 28a to threadably engage the threads 24a of compression nut 24. The housing 28 supports a fiber guide 44 having a tapered end surface 43 and a centrally disposed aperture 45 through which the fiber 12 is initially inserted. The fiber guide 44 is arranged to move axially in the housing under the influence of biasing means in the form of a spring 46. A coupler 34 for connecting the sub-assembly 21 to a connector-type termination apparatus as will be described is fixedly secured by a ring 38 to the housing 28 for rotative support. The coupler 34 is provided with interior threads 34a.

Upon threading the compression nut 24 into the housing 28, the split ferrule is forced by the nut 24 into the tapered surface 19 of the retainer ring 22 causing the split ferrule to compressively tighten around the cable jacket 20 and thereby securely hold the cable 10 fixed within the housing 28 with the fiber 12 extending through the aperture 45. Suitable means are utilized to compressively retract the fiber guide 44 on the spring 46, leftwardly as shown in FIG. 2, and then to cleave the fiber 12. The fiber is then released thus leaving the free end 47 of the fiber 12 within the fiber guide 44 at a predetermined spacing from the free end of the guide as illustrated.

Connector type termination apparatus shown in FIG. 3 in accordance with a preferred embodiment of the invention comprises an elongate housing 26 including a central housing section 32, the cable sub-assembly 21 as described in FIG. 2 constituting the leftward housing section and a similarly constructed sub-assembly 31 constituting the rightward housing section. In the same fashion as sub-assembly 21, the cable 10 as prepared in accordance with FIG. 1 is inserted into an elongated housing 30 having interior threads to engage the exterior threads of nut 24. A fiber guide 48 is supported for translatory movement under the influence of a spring 50. A ring 40 secures a coupler 36 for rotative movement thereon, coupler 36 being threaded interiorly for threadably engaging section 32 as will be described.

In assembling the apparatus 26, the leftward fiber guide 44 is inserted into an entry aperture 33 leftwardly in section 32 and the rightward fiber guide 48 is inserted into an entry aperture 35 rightwardly in housing section 32. Section 32 is exteriorly threaded to engage the interior threads of couplers 34 and 36. As couplers 34 and 36 are threadably rotated, the housings 28 and 30 are drawn inwardly toward central section 32 and the fiber guides 44 and 48 inwardly toward a fiber engagement/abutment unit 52 fixedly supported in a central bore in section 32 to be in registry with the fiber guides 44, 48. A seat 58 is provided for receipt of the tapered end of fiber guide 48 and a seat is defined for fiber guide 44 by an interiorly tapered portion 32a of the central housing section 32. Upon seating of the fiber guides 44, 48 in their respective seats and continued threading of the couplers 34, 36, the fibers 12 within the respective guides extend through the guide apertures as the springs 46 and 50 are compressed. The apparatus is constructed so that upon engagement of the housings 28, 30 with the central section 32, the respective fibers 12 abut the engagement/abutment unit 52 from both sides.

The engagement/abutment unit 52 is shown in a particularly preferred embodiment in FIG. 3 and comprises an outer race, three spheres, one being indicated at 54, and a retaining ring 56 adapted to secure the spheres within the race. The function of engagement/abutment unit 52 will be more clearly understood from consideration of FIGS. 4 and 5.

Figure 5:
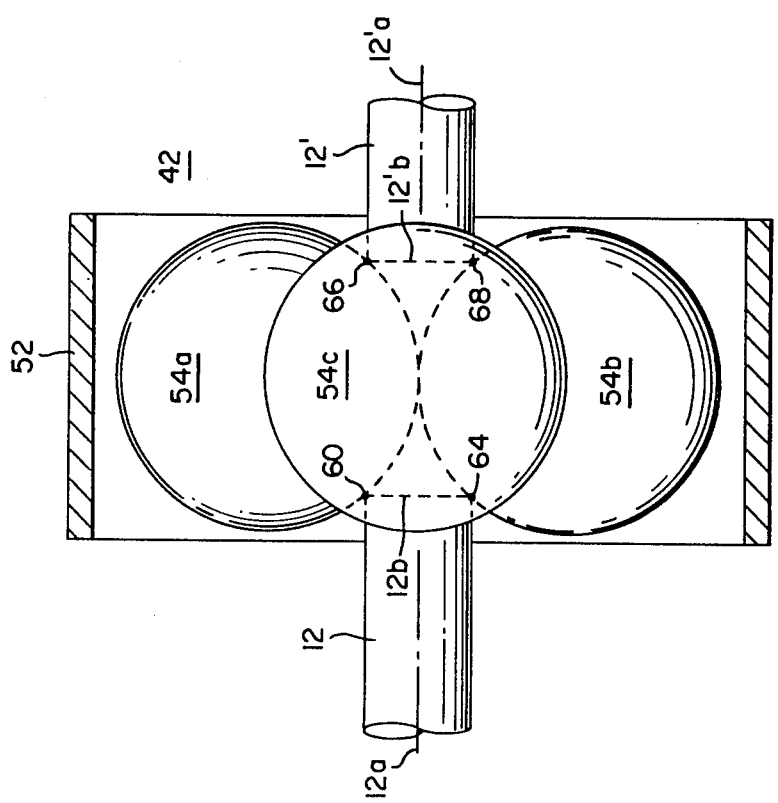
FIG. 5 is a schematic sectional view of the FIG. 4 apparatus along line V—V of FIG. 4.

FIG. 4 is a view seen from immediately leftward of engagement/abutment unit 52, in FIG. 3, with retaining ring 56 omitted for convenience. The race of unit 52 is of circular configuration and is tangentially in contact with outer surfaces of spheres 54a, 54b and 54c. Fiber 12 is in abutting relation with essentially point surface areas 60, 62 and 64 of spheres 54a, 54c and 54b, respectively. As is seen in FIG. 5 such point surface areas are coincident with the plane of the end face 12b of fiber 12. Such abutting relation of fiber end termination unit provides for a self-centering of the fiber, whereby the fiber longitudinal axis will be coincident with the center of the composite of spheres employed. Abutment is assured by preselection of the interstitial spacing between the spheres in a measure less than the fiber outer diameter such that the fiber is prevented from passing therethrough. Viewed otherwise, the fiber terminating unit includes engagement means which define mutually discontinuous surfaces in abutting relation to the fiber end face, with the surfaces being spaced from one another in a circular locus having a diameter not greater than the diameter of the fiber. As noted above, the surfaces of the termination means which abut the fiber end face are mutually spaced in a plane coincident with the fiber end face and are desirably mutually spaced in the circular locus in such plane. Thus, as used herein, the term abutting refers to the contact of the fiber at its end face or peripheral edge surface with the surfaces of the termination means in a circular locus. Convenience is found in the preferred embodiment, in the sense that each of the bodies involved defines a distinct one of the abutting surfaces. Spheres are desirable forms for such alignment bodies based on convenience of manufacture and assembly and the spheres are preferably of common diameter having centers in a common plane, the spheres being in tangential contact with each other. In such a configuration, abutment can be assured by selection of the sphere diameter to be less than $(\sqrt{3}/(2-\sqrt{3}))$ times the diameter of the fiber. However, it should be understood that the selected interstitial opening in practice should be preferably not less than the diameter of the optical core of the fiber in a manner as set forth, for example, in U.S. Pat. No. 4,186,998. An alternative configuration of terminating means, not shown herein, would involve the formation of such mutually discontinuous surfaces by the machining of a unitary body, however, with evident disadvantage in respect of manufacture.

In the particular terminating example shown in FIG. 5, a second optical fiber 12' is to be optically coupled with fiber 12, with axes 12a and 12'a coincident to provide for respective alignment. Surface areas 66 and 68 are now defined as between end face 12'b of fiber 12' and spheres 54a and 54b, respectively. Surfaces 66 and 68 will be appreciated are aligned respectively with surfaces 60 and 64, of spheres 54a and 54b and a further abutment surface area (not indicated) will apply as between fiber 12' and sphere 54c, aligned with surface area 62.

Among the several unique geometric characteristics of the terminating means of FIGS. 4 and 5 is that alignment between separate optical fibers is provided through a single abutting terminating means comprised of three spheres and to be contrasted with the customary appearance in the art of successive sets of three spheres longitudinally spaced along an axis intended for alignment of fibers and having interstices permitting non-abutting passage of fibers therethrough. Also, it is to be noted that each unitary body employed in the terminating apparatus, i.e., each sphere in the illustrated preferred embodiment, defines a pair of abutting surface areas, one for each of the separate fibers to be joined. Viewed along the axis of alignment, the terminating means defines first and second sets of surfaces discontinuous about the longitudinal axis of a housing and respectively in facing relation to first and second housing entry apertures, with the terminating apparatus including at least one unitary body defining a surface of each of the first and second surface sets.

Figure 6:
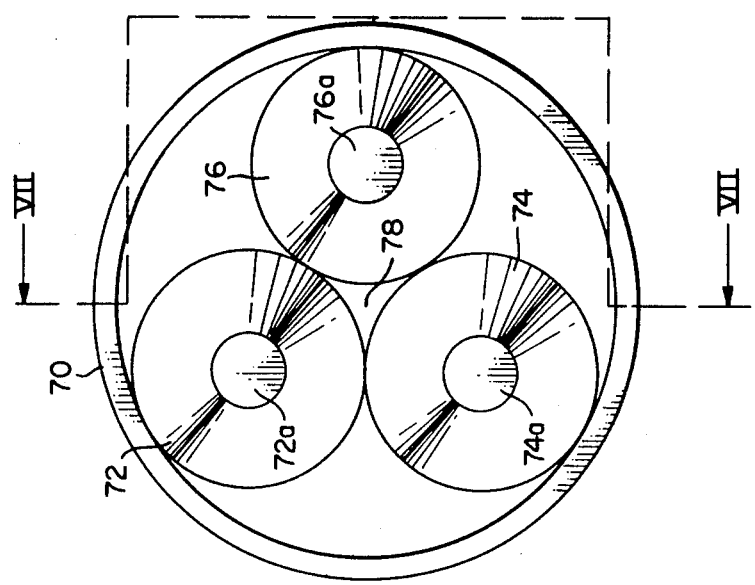
FIG. 6 is a schematic end elevation view of alternative terminating apparatus in accordance with the invention.
Figure 7:
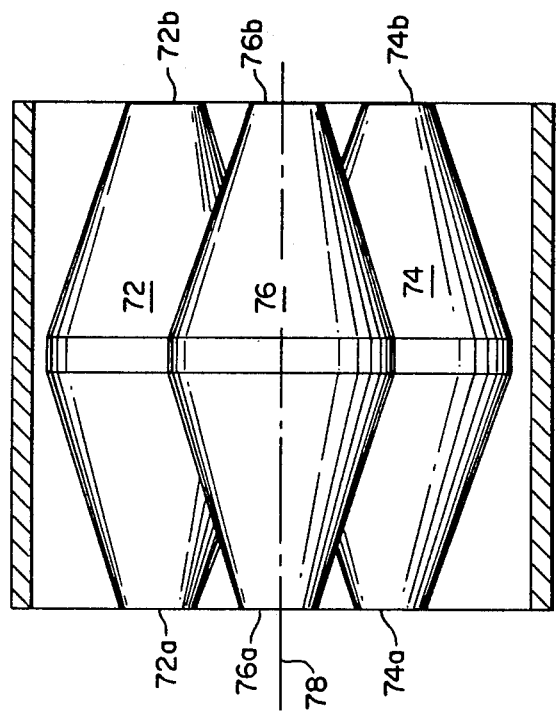
FIG. 7 is a side elevation view of the FIG. 6 apparatus along line VII—VII of FIG. 6.

Referring now to FIGS. 6 and 7, a further alternative embodiment of terminating structure in accordance with the invention involves tapered cones 72, 74 and 76. The cones may be bilaterally tapered oppositely along axis 78 to define end faces 72a and 72b, 74a and 76b, and 76a and 76. Centrally of such end faces, the cones have cylindrical center portions in tangential contact with each other, as in the case of the previously described sphere embodiment, and also are in tangential relation with race 70 which retains the cones in alignment. As will be seen, a fiber entering the tapered interior surfaces of the cones will confront surfaces mutually discontinuous about axis 78 and adapted for three-point engagement abuttingly with the fiber end face in a circular locus. Again, the cone surfaces about axis 78 are selected such that the diameter of the circular locus is not greater than the diameter of the fiber to assure that the fiber does not pass through the interstitial spacing between cone surfaces.

Figure 8:
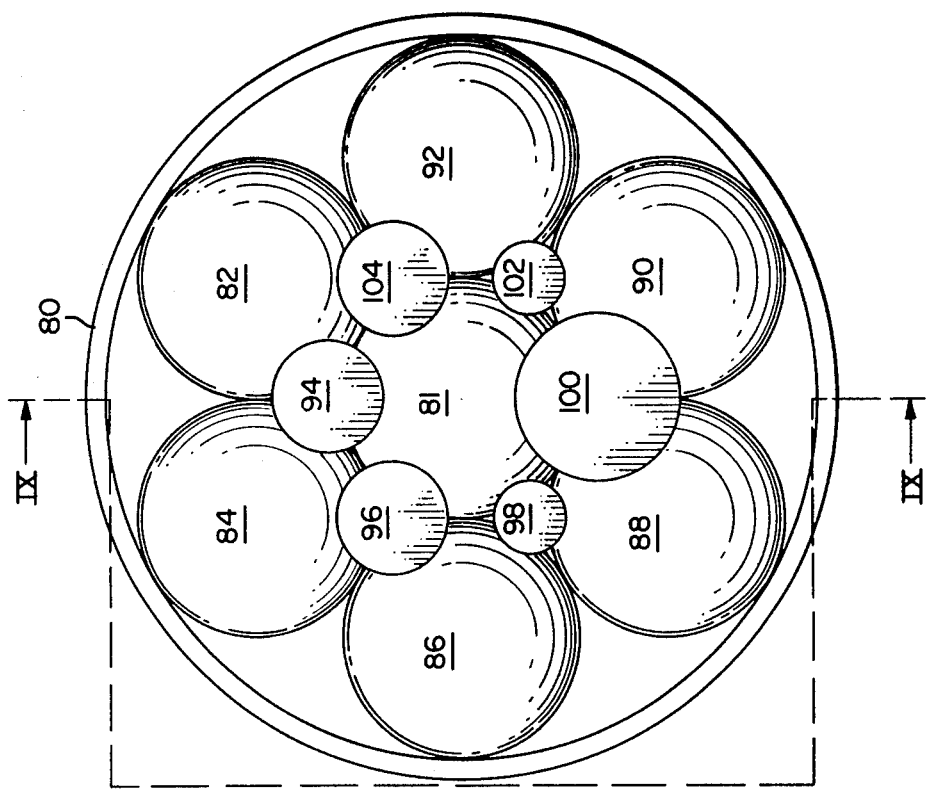
FIG. 8 is a schematic end elevation view of a further embodiment of terminating apparatus in accordance with the invention.
Figure 9:
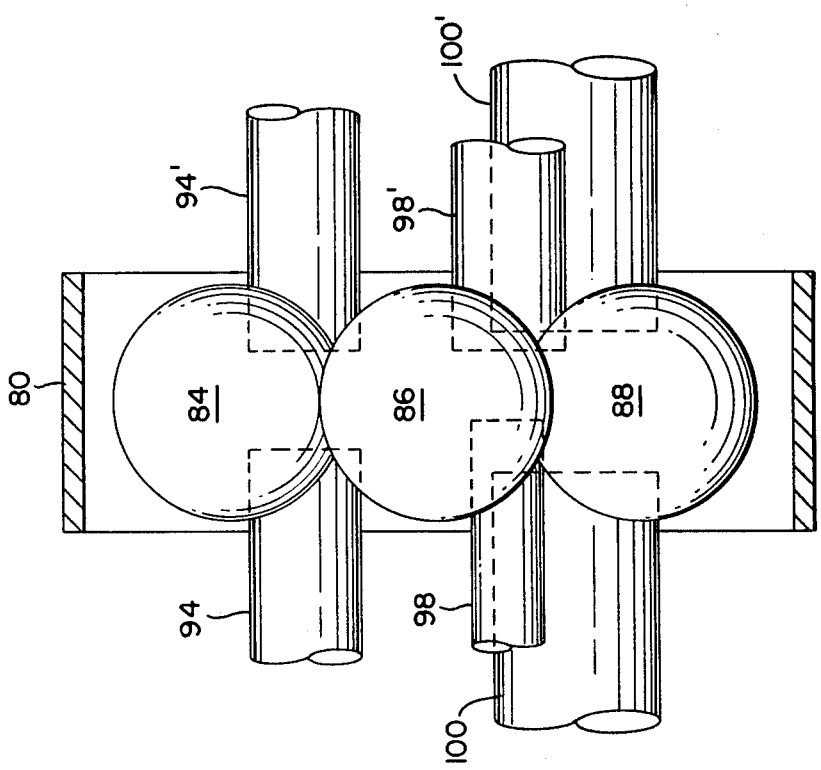
FIG. 9 is a sectional elevation view of the FIG. 8 apparatus as seen from line IX—IX of FIG. 8 with selective joined fibers being omitted for clarity.

While the optical element terminating apparatus discussed to this juncture has provided for registration of a pair of optical elements along a cylindrical alignment axis, the invention readily goes therebeyond to the alignment of plural sets of optical fibers, apparatus suitable for this purpose being indicated in FIGS. 8 and 9. Referring thereto, race 80 contains a central sphere 81, tangentially in contact with six additional spheres numbers 82–92. Six interstitial passages are defined collectively by these spheres and optical fibers 94–104 are shown separately in registry with each such interstitial aperture. For convenience of demonstration, FIG. 9 shows only several of such optical fibers, namely, fibers 94, 98 and 100. As will be seen, fiber 94 is in alignment with second fiber 94' through the abutting agency of spheres 81, 82 and 84. Fiber 100 is shown as being of larger diameter than fiber 94 and is in registry with second fiber 100' through the agency of spheres 81, 88 and 90. Fiber 98 is selected of lesser cross sectional size than fibers 94 and 100 and is disposed in registry with second fiber 98', of larger cross sectional dimension than fiber 9, through the agency of spheres 81, 86 and 88. Particularly to be noted in the arrangement of FIGS. 8 and 9 is the capability for abutting registration of a first set of optical fibers, i.e., leftwardly in FIG. 9 and a second set of fibers shown rightwardly in FIG. 9, wherein each set of fibers may include fibers of different cross sectional area, each, however, greater than the interstitial dimension between spheres, and wherein such fibers may be placed in registry with second set of fibers of any selected cross sectional dimension again exceeding the interstitial dimension.

In all of the foregoing embodiments, one achieves alignment in X, Y and Z axes and, as alluded to earlier, confronts the least adverse coupling efficiency parameter, namely, spacing of aligned fiber end faces along the alignment axis. It should be understood, however, that while the spacing between the end faces of aligned fibers is of least concern, it is desirable to minimize such spacing in practice. For example, to maintain coupling losses to a practicable level, it is preferable to provide an end face separation not greater than the radius of the core of the optical fiber in a manner as set forth by Haruhiko Tsuchiya et al. in "Double Eccentric Connectors for Optical Fibers,"*Applied Optics*, Vol. 16, No. 5, May, 1977. The effects of the spacing between fiber end faces may, however, be further negated by filling the spacing with a known index matching fluid for minimizing the optical loss between the fibers, the fluid having substantially the same index of refraction as that of the fibers.

Common to the several practices above described is a method wherein an elongate optical element is terminated along any given axis by the steps of: (1) defining a plurality of surfaces mutually spaced about such given axis and mutually spaced in a circular locus having a diameter less than the maximum dimension of the optical element end face transversely of the optical element longitudinal axis; and (2) placing the optical element end face and the surfaces in mutually abutting relation.

Various changes and modifications may be introduced in the foregoing embodiments without departing from the apparatus or method of the invention. In addition to coupling separate optical fibers, the invention may also be used to terminate single fibers, such termination referring, for example, to the coupling of the fiber to an active device or to a "dead-ending" device preventing back reflections of light. By way of illustration, the invention contemplates terminating a single optical fiber with a transducer, such as a light source or detector. In such case, the above-discussed second set of discontinuous surfaces of the engagement means abuts registration surfaces of the transducer. The particularly preferred disclosed embodiments and practices are accordingly intended in a descriptive and not in a limiting sense. The true spirit and scope of the invention is set forth in the following claims.

What is claimed is:

1. A terminated optical fiber assembly comprising an optical fiber having an end face and fiber terminating means including engagement means defining mutually discontinuous surfaces in abutting relation to said fiber end face, said surfaces being spaced from one another in a circular locus having a diameter less than the diameter of said fiber, whereby said fiber is restrained from passing through said engagement means.

2. The assembly claimed in claim 1 wherein said surfaces are configured to present abutting surface areas to said fiber, said surface areas in said circular locus being mutually spaced in a plane coincident with said fiber end face.

3. The assembly claimed in claim 2 wherein said surface areas are equally mutually spaced in such plane.

4. The assembly claimed in claim 1 wherein said engagement means comprises a plurality of bodies, each defining a distinct one of said surfaces.

5. The assembly claimed in claim 4 wherein said bodies are spheres.

6. The assembly claimed in claim 5 wherein said spheres are of common diameter and have centers in a common plane, such common plane being spaced axially from said fiber end face.

7. The assembly claimed in claim 1 wherein said fiber terminating means further includes fiber guide means in registry with said engagement means.

8. The assembly claimed in claim 7 further including an elongate housing supporting said fiber terminating means and said fiber guide means in registry along said fiber central axis.

9. The assembly claimed in claim 8 wherein said fiber includes a fitting secured thereto, said housing defining an entry aperture for said fiber and for releasable joinder with said fitting.

10. The assembly claimed in claim 9 further including means supported in said housing for biasing said fiber guides means longitudinally in said housing toward said engagement means.

11. The assembly claimed in claim 1 wherein said fiber terminating means comprises a further optical fiber having an end face, said engagement means defining additional mutually discontinuous surfaces in abutting relation to said further optical fiber end face, said additional surfaces being spaced from one another in a circular locus having a diameter less than the diameter of said further optical fiber, the respective end faces of said terminated optical fibers being axially spaced from one another.

12. The assembly claimed in claim 11 wherein said engagement means comprises a plurality of bodies, each defining both a distinct one of said first-mentioned surfaces and a distinct one of said additional surfaces.

13. The assembly claim in claim 12 wherein said bodies are spheres.

14. The assembly claimed in claim 13 wherein said spheres are of common diameter and have centers in a common plane.

15. The assembly claimed in claim 11 wherein the peripheral edge of said end face of said further optical fiber is in abutting relation with said additional mutually discontinuous surfaces.

16. The assembly claimed in claim 1 wherein the peripheral edge of said end face is in abutting relation with said mutually discontinuous surfaces.

17. A kit of parts comprising: at least two optical elements each having an end face; and an apparatus adapted for joining said optical elements including an elongate housing having first and second longitudinally opposed entry apertures for said optical elements and terminating means having first and second sets of surfaces discontinuous about the longitudinal axis of said housing and adapted to be abutted by the respective end faces of said optical elements and respectively disposed in facing relation to said first and second entry apertures, said first and second sets of surfaces being longitudinally spaced from one another, said terminating means comprising at least one unitary body defining a surface of each of such first and second surface sets.

18. The kit claimed in claim 17 wherein each of said first and second sets of surfaces are mutually spaced in a circular locus in planes coincident with the respective end faces of said optical elements.

19. The kit claimed in claim 17 wherein said terminating means comprises a plurality of unitary bodies, each defining a distinct surface of each of said first and second surface sets.

20. The kit claimed in claim 19 wherein said bodies are spheres.

21. The kit claimed in claim 20 wherein said spheres are of common diameter and having centers in a common plane.

22. The kit claimed in claim 17 wherein said housing includes first and second optical element guide means respectively extending from said first and second entry apertures to said terminating means.

23. A method for terminating, along an axis, an elongate optical element having an end face, comprising the steps of: defining a plurality of surfaces mutually discontinuously spaced about said axis and mutually spaced in a circular locus having a diameter less than the maximum dimension of said optical element end face transversely of the element longitudinal axis; and placing said optical element and optical element end face in abutting relation with said discontinuous surfaces such that said optical element does not pass axially through said discontinuous surfaces.

24. The method claimed in claim 23 wherein the placing of said optical element is practiced by positioning the peripheral edge of said optical element end face in abutting relation with said discontinuous surfaces.

25. Apparatus for joining optical elements comprising an elongate housing having first and second longitudinally opposed entry apertures for said optical elements and means for terminating said optical elements in spaced disposition having first and second sets of surfaces discontinuous about the longitudinal axis of said housing and respectively lying in facing relation to said first and second entry apertures, said terminating means including at least one unitary body defining a surface of each of said first and second surface sets, said first and second sets of surfaces being longitudinally spaced from one another within said housing.

26. The apparatus claimed in claim 25, wherein said terminating means comprises a plurality of unitary bodies, each defining a distinct surface of each of said first and second surface sets.

* * * * *